Figure 1:
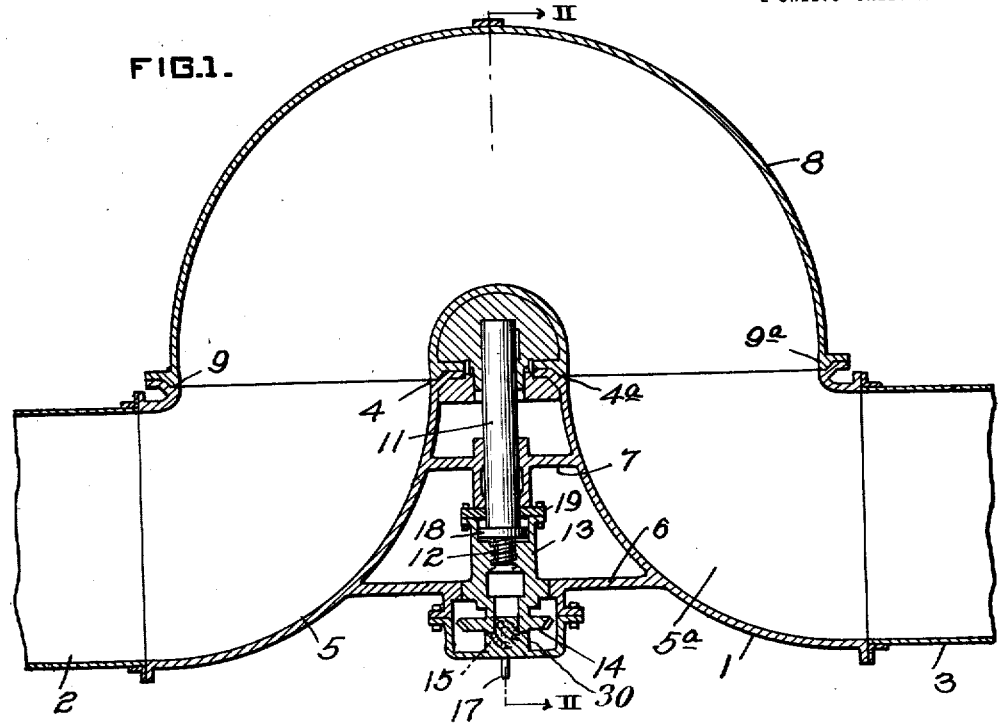

H. N. CUPP.
VALVE.
APPLICATION FILED JUNE 2, 1919.

1,349,605.

Patented Aug. 17, 1920.
2 SHEETS—SHEET 1.

WITNESSES
J. Herbert Bradley.
Francis J. Tomasson.

INVENTOR
Harry N. Cupp,
by Christy & Christy,
his attorneys.

H. N. CUPP.
VALVE.
APPLICATION FILED JUNE 2, 1919.
1,349,605.
Patented Aug. 17, 1920.
2 SHEETS—SHEET 2.
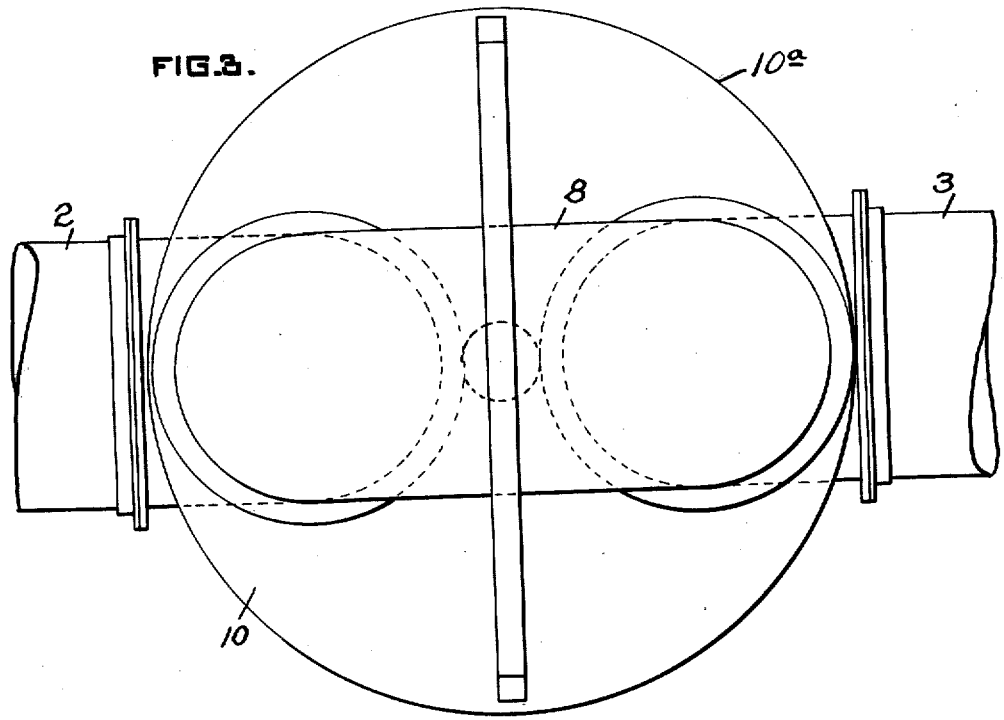
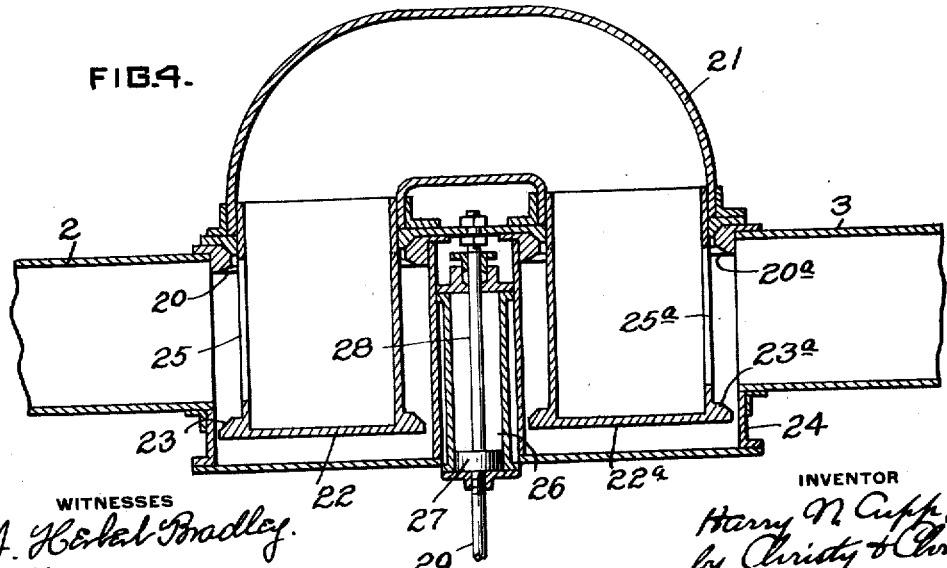

UNITED STATES PATENT OFFICE.

HARRY N. CUPP, OF MARS, PENNSYLVANIA, ASSIGNOR OF ONE-HALF TO THOMAS G. MONAHAN, OF PITTSBURGH, PENNSYLVANIA.

VALVE.

1,349,605.  Specification of Letters Patent.  Patented Aug. 17, 1920.

Application filed June 2, 1919. Serial No. 301,285.

*To all whom it may concern:*

Be it known that I, HARRY N. CUPP, residing at Mars, in the county of Butler and State of Pennsylvania, a citizen of the United States, have invented or discovered certain new and useful Improvements in Valves, of which improvements the following is a specification.

In blast furnace plants highly heated dust-laden gases are carried from the furnace to dust catcher, gas washer, hot stoves, etc., in conduits which are frequently from six to eight feet in diameter. When, as occasionally happens, it becomes necessary to clean or repair such a conduit, the usual practice is to remove the manhole cover and place a crew of workmen in the conduit, first shutting off the flow of gases. For thus controlling the flow of gases the prevailing practice is to use what is known as a Crawford valve, whereby the inlet end of the conduit is closed and sealed with a body of water. However, such a valve is not under all conditions effective, for, in the event of a puff or explosion in the furnace, the water seal may be, and occasionally is, broken with the result that gas enters the conduit and endangers the lives of the crew of workmen in the conduit.

Because the high temperature of furnace gases and the volume of dust carried by them preclude the use of types of positively acting valves ordinarily used for controlling the flow of gases, a specially designed valve known as a "goggle valve" is sometimes employed in blast furnace conduits, in addition to a Crawford valve. Such goggle valve consists merely of a plate, one portion of which is provided with an opening of substantially the same diameter as that of the interior of the conduit, and another portion of which is imperforate. This plate is placed between adjacent ends of two sections of the conduit according to intention movable from one to another of two alternate positions. In one position of the plate its opening registers with and permits flow through the conduit, while in its other position the imperforate portion of the plate prevents such flow.

Due chiefly to the thermal expansion of the conduit when highly heated by the gases, considerable difficulty has been experienced in so maintaining this valve that there is on the one hand no leakage at the point where it is placed and on the other hand it may freely be moved. In point of fact the goggle valve has sometimes because of this difficulty been found unworkable, and in such case the workmen who enter the conduit are protected only by the uncertain Crawford valve already explained.

The object of my invention, which relates to valves for controlling the flow of highly heated dust-laden gases through conduits, is to provide a valve which will not be injured by the heat of, and dust carried by, such gases, which is effective and which may be readily operated when occasion arises for its use.

Figure 2:
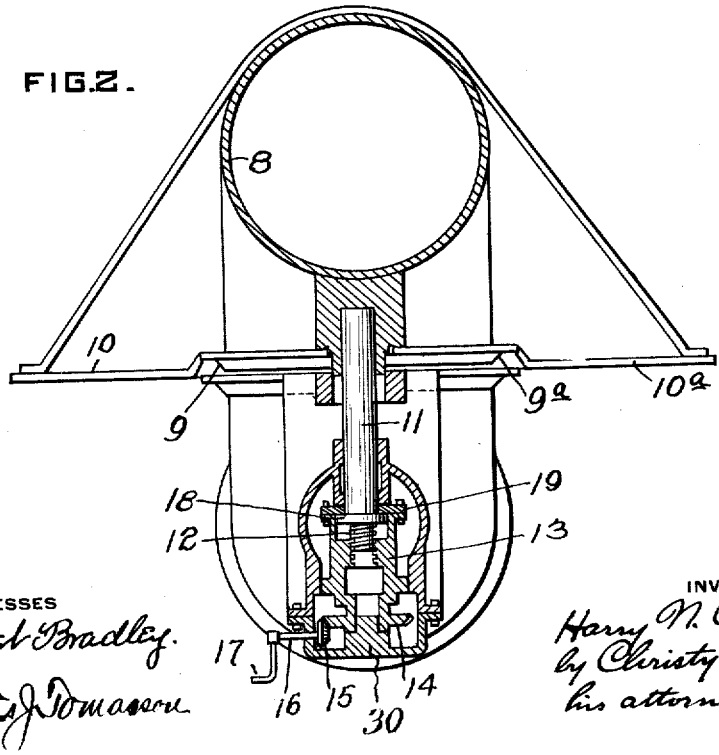

My invention is illustrated in the accompanying sheets of drawings, which form part of my specification. Figure 1 is a central longitudinal section of a conduit and valve attached to it; Fig. 2 a sectional view taken on the line II—II, Fig. 1; Fig. 3 a plan view of the conduit and valve as seen in Fig. 1; and Fig. 4 a view similar to Fig. 1 showing a modification of construction.

The valve which I provide includes a casing adapted to be connected to the adjacent ends of two sections of a conduit for carrying heated dust-laden gases, and a by-pass conduit member movable to positions wherein it alternately places the ends of such conduit sections in communication with each other and closes them from such communication. The casing is constructed to resist longitudinal movement of the ends of the conduit sections due to their thermal expansion, and the casing and by-pass member are provided with coöperating valve elements so constructed and arranged as to be unaffected by the heated gases and the dust which they carry.

Referring to the embodiment of my invention illustrated in Figs. 1, 2 and 3 the valve casing 1 is indicated as being attached to the ends of conduit sections 2 and 3, and as being provided with two valve seats 4 and 4ª, which extend in planes (preferably a common plane) laterally remote from and conveniently parallel to the longitudinal axis of the conduit sections. The casing is provided with two L-shaped passages 5 and 5ª between the adjacent walls of which there extend webs or plates 6 and 7, which form braces acting with the other portions of the casing to resist the longitudinal thermal expansion of the conduit sections.

The by-pass member includes a U-shaped conduit section 8 provided at its lower ends with valve seats 9 and 9ª, which, when the by-pass member is in the position indicated in Fig. 1, rest respectively upon the valve seats 4, 4ª of the casing, so that through the by-pass member communication is established between the conduit sections 2 and 3. As seen in Figs. 2 and 3, the by-pass member 8 is provided with laterally projecting plates 10 and 10ª which lie in the same general plane as the valve seats 9 and 9ª. The by-pass member 8 is movable from the position indicated in Fig. 1 to a position in which the plates 10 and 10ª completely close the open ends of the casing passageways 5 and 5ª. The means provided for moving the by-pass member are preferably arranged between the legs thereof or their prolongation. Such moving means may, as shown in Figs. 1 and 2, comprise a shaft 11, secured at its upper end to the by-pass member, and provided at its lower end with a screw-threaded portion 12. Surrounding this screw-threaded portion there is arranged an interiorly threaded rotatable casing 13, provided at its lower end with a beveled pinion 14, which pinion meshes with another beveled pinion 15 secured to a shaft 16 adapted to be rotated by a crank 17. The shaft 11 is provided with a laterally extending flange 18, and above such flange there is secured to the casing 13 a ring 19 adapted to limit the upward travel of the shaft 11. The casing 13 may be stepped below on a block 30 carried by web 6.

When it becomes necessary to operate the valve, the crank 17 is turned to effect the rotation of the casing 13, which rotation first causes the shaft 11 to move upwardly until the flange 18 engages the ring 19. The relation of parts here is such that when the flange 18 strikes the ring 19 the lower edges of the valve seats 9 and 9ª will be above the upper edges of the valve seats 4 and 4ª. As casing 13 turns further, there can be no further rise of shaft 11, but shaft 11 now turns on its longitudinal axis and in unison with casing 13. By such turning the by-pass member 8 may be swung through an arc of 90°, in which position the plates 10 and 10ª will cover the valve seats 4 and 4ª of the casing 1. To tighten the plates 10 and 10ª upon the seats 4 and 4ª, the sleeve 13 may be turned in a reverse direction, the by-pass member being suitably held against rotation.

Of the form of valve just explained it will be observed that the valve elements are so constructed and arranged that they will not be injured by heated gases or dust, and that the general arrangement of the valve is such that it is beyond the region of thrust due to the thermal expansion of the adjacent conduit sections; consequently it may be freely operated when it becomes necessary to do so.

In the form of valve illustrated in Fig. 4 it is necessary to move the by-pass member in but one direction, in order to close the valve. The valve casing 24 is indicated as being attached to the ends of conduit sections 2 and 3, and is provided with a pair of horizontally disposed valve seats 20 and 20ª. The by-pass member 21 is U-shaped, its lower ends being closed by means of valve plates 22, 22ª, the outer edges of which are provided with seats 23 and 23ª adapted, when the by-pass member is moved to its uppermost position, to rest in the seats 20, 20ª of the casing 24. The sides of the lower ends of the by-pass member are provided with openings 25, 25ª, which, when such member is in its indicated position, communicate respectively with the conduit sections 2 and 3 and thereby place such conduit sections in communication with each other.

As in the form of valve shown in Figs. 1, 2 and 3, the means for operating the valve are arranged between the legs of Fig. 4 the by-pass member. The means shown for such purpose consist of a pressure cylinder 26, provided with a piston 27 attached to a piston rod 28, which rod projects through the upper end of the cylinder and is attached to the by-pass member. By supplying fluid pressure, such as compressed air or steam, through a conduit 29 to the lower end of the cylinder 26, the by-pass member 21 may be raised to its uppermost position in which the seats 23 and 23ª rest within valve seats 20 and 20ª of the casing 24, the plates 22 and 22ª then shutting off flow of gas through the conduit sections.

According to the provisions of the patent statutes, I have described the principle and operation of my invention together with suitable construction whereby it may be practised. However, I desire to have it understood that, within the scope of the appended claims, my invention may be practised by other forms of construction than those specifically shown and described herein.

I claim as my invention:

1. A valve structure for conduits subject to wide variations in temperature, which includes a valve casing arranged between adjacent sections of the conduit, two valve seats arranged in planes parallel with and laterally remote from the general axis of the conduit sections, and a valve member movable to and from said valve seats, substantially as described.

2. The combination of two adjacent sections of a conduit for carrying heated dust-laden gases, of a casing attached to the adjacent ends of said conduit sections and resisting longitudinal thermal expansion thereof, a U-shaped by-pass conduit member arranged between said ends of and movable laterally with respect to said conduit sections, said casing and by-pass member being provided with coöperating valve elements, and means for moving said by-pass member to alternate positions of opening and closing communication between the ends of said conduit section.

3. The combination with two adjacent sections of a conduit for carrying heated dust-laden gases, of a casing attached to the adjacent ends of said conduit sections and resisting longitudinal thermal expansion thereof, said casing being provided with a valve seat, a movable U-shaped by-pass conduit member adapted in one position to afford free communication between the ends of said conduit sections, said by-pass member being provided with a valve adapted to coöperate with said valve seat to close communication between said conduit sections, and means for moving said by-pass member to its alternate positions.

4. The combination with two adjacent sections of a conduit for carrying heated dust-laden gases, of a casing attached to the adjacent ends of said conduit sections and resisting longitudinal thermal expansion thereof, said casing being provided with a valve seat lying in a plane substantially parallel with the general line of extent of said conduit sections, a movable U-shaped by-pass conduit member adapted in one position to afford free communication between the ends of said conduit sections, said by-pass member being provided with a valve adapted to coöperate with said valve seat to close communication between said conduit sections, and means arranged between the legs of said by-pass member to move it to its alternate positions.

5. A valve structure for conduits subject to wide variations in temperature, which includes a valve casing arranged between adjacent alined sections of the conduit, a valve seat arranged to one side of the common axis of said conduit sections, and a valve arranged beyond the region of thrust due to thermal expansion of said conduit sections and movable respecting such valve seat, substantially as described.

In testimony whereof I have hereunto set my hand.

HARRY N. CUPP.

Witnesses:
PAUL N. CRITCHLOW,
FRANCIS J. TOMASSON.